(12) United States Patent
Anderson et al.

(10) Patent No.: US 11,436,405 B1
(45) Date of Patent: *Sep. 6, 2022

(54) SYSTEMS, METHODS, AND COMPUTER-READABLE MEDIA FOR FLOW-THROUGH FORMATTING FOR LINKS

(71) Applicant: WORKIVA INC., Ames, IA (US)

(72) Inventors: Taylor Anderson, Ames, IA (US); Mark David Erickson, Ankeny, IA (US); Hannah Deering, Colorado Springs, CO (US); Jonathan Gray Sandridge, Boulder, CO (US); Christian Plazas, Denver, CO (US); Wilfredo Merced, III, Denver, CO (US); Brian David Bolton, Columbus, GA (US); Bryon Marks, Huxley, IA (US); Ashley Kay Knobloch, Mesa, AZ (US)

(73) Assignee: WORKIVA INC., Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/398,304

(22) Filed: Aug. 10, 2021

Related U.S. Application Data

(63) Continuation of application No. 17/175,910, filed on Feb. 15, 2021, now Pat. No. 11,100,277.

(51) Int. Cl.
*G06F 40/134* (2020.01)
*G06F 40/103* (2020.01)
(Continued)

(52) U.S. Cl.
CPC ........ *G06F 40/134* (2020.01); *G06F 16/9558* (2019.01); *G06F 40/103* (2020.01); *G06F 40/14* (2020.01); *G06F 40/166* (2020.01)

(58) Field of Classification Search
None
See application file for complete search history.

(56) References Cited

U.S. PATENT DOCUMENTS

| 4,807,182 A | 2/1989 | Queen |
| 5,603,021 A | 2/1997 | Spencer et al. |

(Continued)

FOREIGN PATENT DOCUMENTS

WO   2008/107665 A2   9/2008

OTHER PUBLICATIONS

Bewig, "How do you know your spreadsheet is right? Principles, Techniques and Practice of Spreadsheet Style," <http://www.eusprig.org/hdykysir.pdf>, Jul. 28, 2005, 14 pages.

(Continued)

*Primary Examiner* — Maikhanh Nguyen
(74) *Attorney, Agent, or Firm* — Faegre Drinker Biddle & Reath LLP

(57) ABSTRACT

A method for rendering linked content in a first document is described. A first user entry of a first link in the first document is received at a computing device. The first link refers to a first set of content having a source location that is external to the first user entry. The first set of content is displayed with a first display format of the source location in a user interface that displays the first document. Displaying the first set of content includes retrieving, by the computing device, the first set of content using the first link. Displaying the first set of content also includes updating the user interface to display both the first set of content and a second set of content that is distinct from the first set of content.

23 Claims, 14 Drawing Sheets

(51) Int. Cl.
  *G06F 40/166* (2020.01)
  *G06F 40/14* (2020.01)
  *G06F 16/955* (2019.01)

(56) References Cited

U.S. PATENT DOCUMENTS

| | | | |
|---|---|---|---|
| 5,758,356 | A | 5/1998 | Hara et al. |
| 5,883,623 | A | 3/1999 | Cseri |
| 6,057,837 | A | 5/2000 | Hatakeda et al. |
| 6,138,130 | A | 10/2000 | Adler et al. |
| 6,230,173 | B1 | 5/2001 | Ferrel et al. |
| 6,252,605 | B1 | 6/2001 | Beesley et al. |
| 6,460,059 | B1 | 10/2002 | Wisniewski |
| 6,572,660 | B1 | 6/2003 | Okamoto |
| 6,631,385 | B2 | 10/2003 | Lee et al. |
| 6,741,998 | B2 | 5/2004 | Ruth et al. |
| 6,792,454 | B2 | 9/2004 | Nakano et al. |
| 6,848,077 | B1 | 1/2005 | McBrearty et al. |
| 6,909,965 | B1 | 6/2005 | Beesley et al. |
| 6,948,154 | B1 | 9/2005 | Rothermel et al. |
| 7,080,065 | B1 | 7/2006 | Kothuri et al. |
| 7,096,422 | B2 | 8/2006 | Rothschiller et al. |
| 7,124,362 | B2 | 10/2006 | Tischer |
| 7,181,467 | B2 | 2/2007 | Kothuri |
| 7,219,108 | B2 | 5/2007 | Kothuri et al. |
| 7,249,314 | B2 | 7/2007 | Walker et al. |
| 7,424,671 | B2 | 9/2008 | Elza et al. |
| 7,496,837 | B1 | 2/2009 | Larcheveque et al. |
| 7,496,841 | B2 | 2/2009 | Hadfield et al. |
| 7,587,471 | B2 | 9/2009 | Yasuda et al. |
| 7,631,255 | B2 | 12/2009 | Weise et al. |
| 7,734,714 | B2 | 6/2010 | Rogers |
| 7,761,403 | B2 | 7/2010 | Witkowski et al. |
| 7,792,847 | B2 | 9/2010 | Dickerman et al. |
| 7,809,712 | B2 | 10/2010 | Witkowski et al. |
| 7,827,208 | B2 | 11/2010 | Bosworth et al. |
| 7,984,371 | B2 | 7/2011 | Zdenek |
| 8,015,235 | B1 | 9/2011 | Bauer et al. |
| 8,108,464 | B1 | 1/2012 | Rochelle et al. |
| 8,307,337 | B2 | 11/2012 | Chamieh et al. |
| 8,332,747 | B2 | 12/2012 | Carro et al. |
| 8,335,783 | B2 | 12/2012 | Milby |
| 8,412,813 | B2 | 4/2013 | Carlson et al. |
| 8,423,471 | B1 | 4/2013 | Emigh et al. |
| 8,527,865 | B2 | 9/2013 | Li et al. |
| 8,555,161 | B2 | 10/2013 | Parker |
| 8,595,620 | B2 | 11/2013 | Larsen et al. |
| 8,595,750 | B2 | 11/2013 | Agarwal et al. |
| 8,607,207 | B2 | 12/2013 | Chamieh et al. |
| 8,645,929 | B2 | 2/2014 | Chamieh et al. |
| 8,656,290 | B1 | 2/2014 | Greenspan et al. |
| 8,707,156 | B2 | 4/2014 | Xue et al. |
| 8,745,483 | B2 | 6/2014 | Chavoustie et al. |
| 8,825,594 | B2 | 9/2014 | Skaria et al. |
| 8,849,834 | B2 | 9/2014 | Milby |
| 8,856,234 | B2 | 10/2014 | Kluin et al. |
| 8,869,020 | B2 | 10/2014 | Daga |
| 8,954,457 | B2 | 2/2015 | Fablet et al. |
| 9,015,301 | B2 | 4/2015 | Redlich et al. |
| 9,152,686 | B2 | 10/2015 | Whitehead et al. |
| 9,292,366 | B2 | 3/2016 | Carro et al. |
| 9,292,482 | B1 | 3/2016 | Thiesen et al. |
| 9,292,507 | B2 | 3/2016 | Calkowski et al. |
| 9,552,343 | B2 | 1/2017 | Thiesen et al. |
| 9,613,055 | B2 | 4/2017 | Tyercha et al. |
| 9,720,931 | B2 | 8/2017 | Tyercha et al. |
| 10,133,708 | B2 | 11/2018 | Carro et al. |
| 10,147,054 | B2 | 12/2018 | Dayon et al. |
| 10,223,340 | B2 | 3/2019 | Soni |
| 10,325,014 | B2 | 6/2019 | Nelson et al. |
| 10,331,776 | B2 | 6/2019 | Thiesen et al. |
| 10,635,744 | B2 | 4/2020 | Beth et al. |
| 10,878,182 | B2 | 12/2020 | Thiesen et al. |
| 10,936,808 | B2 | 3/2021 | Soni |
| 2002/0049697 | A1 | 4/2002 | Nakano et al. |
| 2002/0065848 | A1 | 5/2002 | Walker et al. |
| 2002/0103825 | A1 | 8/2002 | Bauchot |
| 2003/0028545 | A1 | 2/2003 | Wang et al. |
| 2003/0079157 | A1 | 4/2003 | Lee et al. |
| 2003/0112273 | A1 | 6/2003 | Hadfield et al. |
| 2003/0121008 | A1 | 6/2003 | Tischer |
| 2003/0128243 | A1 | 7/2003 | Okamoto et al. |
| 2004/0024752 | A1 | 2/2004 | Manber et al. |
| 2004/0133567 | A1 | 7/2004 | Witkowski et al. |
| 2004/0172616 | A1 | 9/2004 | Rothschiller et al. |
| 2004/0181543 | A1 | 9/2004 | Wu et al. |
| 2004/0193615 | A1 | 9/2004 | Kothuri |
| 2005/0132070 | A1 | 6/2005 | Redlich et al. |
| 2005/0149851 | A1 | 7/2005 | Mittal |
| 2006/0044307 | A1 | 3/2006 | Song |
| 2006/0080594 | A1 | 4/2006 | Chavoustie et al. |
| 2006/0085386 | A1 | 4/2006 | Thanu et al. |
| 2006/0101324 | A1 | 5/2006 | Goldberg et al. |
| 2006/0143607 | A1 | 6/2006 | Morris |
| 2006/0224946 | A1 | 10/2006 | Barrett et al. |
| 2006/0271868 | A1 | 11/2006 | Sullivan et al. |
| 2007/0033519 | A1 | 2/2007 | Zdenek |
| 2007/0124281 | A1 | 5/2007 | Cowan |
| 2007/0136698 | A1 | 6/2007 | Trujillo et al. |
| 2007/0186157 | A1 | 8/2007 | Walker et al. |
| 2007/0219956 | A1 | 9/2007 | Milton |
| 2007/0220415 | A1 | 9/2007 | Cheng et al. |
| 2007/0245409 | A1 | 10/2007 | Harris et al. |
| 2008/0005164 | A1 | 1/2008 | Yee et al. |
| 2008/0114720 | A1 | 5/2008 | Smith et al. |
| 2008/0134138 | A1 | 6/2008 | Chamieh et al. |
| 2008/0148140 | A1 | 6/2008 | Nakano |
| 2008/0162532 | A1 | 7/2008 | Daga |
| 2008/0177825 | A1 | 7/2008 | Dubinko et al. |
| 2008/0300864 | A1 | 12/2008 | Smith |
| 2008/0306983 | A1 | 12/2008 | Singh |
| 2009/0044283 | A1 | 2/2009 | Yoshihama |
| 2009/0063949 | A1 | 3/2009 | Duan |
| 2009/0094242 | A1 | 4/2009 | Lo et al. |
| 2009/0100324 | A1 | 4/2009 | Aureglia et al. |
| 2009/0150426 | A1 | 6/2009 | Cannon et al. |
| 2009/0182837 | A1 | 7/2009 | Rogers |
| 2009/0199090 | A1 | 8/2009 | Poston et al. |
| 2009/0292730 | A1 | 11/2009 | Li et al. |
| 2009/0327213 | A1 | 12/2009 | Choudhary |
| 2010/0058176 | A1 | 3/2010 | Carro et al. |
| 2010/0077331 | A1 | 3/2010 | Bargh et al. |
| 2010/0257439 | A1 | 10/2010 | Xue et al. |
| 2011/0106795 | A1 | 5/2011 | Maim |
| 2011/0202968 | A1 | 8/2011 | Nurmi |
| 2011/0271179 | A1 | 11/2011 | Jasko et al. |
| 2012/0030563 | A1 | 2/2012 | Lemonik et al. |
| 2012/0136874 | A1 | 5/2012 | Milby |
| 2012/0137308 | A1 | 5/2012 | Agarwal et al. |
| 2012/0151312 | A1 | 6/2012 | Clee et al. |
| 2012/0173612 | A1 | 7/2012 | Vegesna-Venkata et al. |
| 2012/0330984 | A1 | 12/2012 | Fablet et al. |
| 2012/0331379 | A1 | 12/2012 | Carro et al. |
| 2013/0232475 | A1 | 9/2013 | Chamieh et al. |
| 2014/0047327 | A1 | 2/2014 | Larsen et al. |
| 2014/0082470 | A1 | 3/2014 | Trebas et al. |
| 2014/0129645 | A1 | 5/2014 | Mo |
| 2014/0181016 | A1 | 6/2014 | Whitehead et al. |
| 2014/0188544 | A1 | 7/2014 | Senescu |
| 2014/0245257 | A1 | 8/2014 | Kusmer et al. |
| 2014/0282101 | A1 | 9/2014 | Beechuk et al. |
| 2015/0052100 | A1 | 2/2015 | Calkowski et al. |
| 2015/0058449 | A1 | 2/2015 | Garg et al. |
| 2015/0100304 | A1 | 4/2015 | Tealdi et al. |
| 2015/0100594 | A1 | 4/2015 | Hess et al. |
| 2015/0199270 | A1 | 7/2015 | Day-Richter et al. |
| 2015/0324373 | A1 | 11/2015 | Tyercha et al. |
| 2015/0324399 | A1 | 11/2015 | Tyercha et al. |
| 2016/0162128 | A1 | 6/2016 | Hansen et al. |
| 2016/0239488 | A1 | 8/2016 | Aguilon et al. |
| 2016/0344667 | A1 | 11/2016 | Lane et al. |
| 2016/0378737 | A1 | 12/2016 | Keslin et al. |
| 2017/0132188 | A1 | 5/2017 | Thiesen et al. |
| 2017/0220546 | A1 | 8/2017 | Codrington et al. |

(56) References Cited

U.S. PATENT DOCUMENTS

| | | |
|---|---|---|
| 2017/0308511 A1 | 10/2017 | Beth et al. |
| 2018/0165260 A1 | 6/2018 | Soni |
| 2019/0102370 A1 | 4/2019 | Nelson et al. |
| 2020/0250383 A1 | 8/2020 | Cheng |
| 2021/0064817 A1 | 3/2021 | Deering et al. |
| 2021/0081605 A1 | 3/2021 | Smith et al. |

OTHER PUBLICATIONS

Burnett et al., "Testing Homogeneous Spreadsheet Grids with the "What You See Is What You Test" Methodology," IEEE Transactions on Software Engineering, Jun. 2002, vol. 28, No. 6, pp. 576-594.

Extendoffice, "How to insert multiple hyperlinks in a cell in Excel?", ExtendOffice.com, <https://web.archive.org/web/20150409040726/https://www.extendoffice.com/documents/excel/916-excel-insert-mulitple-hyperlinks.html>, 2015, 3 pages.

Grishchenko, "Deep Hypertext with Embedded Revision Control Implemented in regular Expressions," Proceedings of the 6th International Symposium on Wikis and Open Collaboration, ACM, 2010, 10 pages.

Grishchenko et al., "Referencing within evolving hypertext," Second international Workshop on Dynamic and Adaptive Hypertext, 2011, 12 pages.

Guttman, "R-Trees: A Dynamic Index Structure for Spatial Searching," ACM, 1984, pp. 47-57.

Ignat et al., "Tree-based model algorithm for maintaining consistency in real-time collaborative editing systems," The Fourth International Workshop on Collaborative Editing Systems, CSCW 2002, New Orleans, USA, Nov. 2002, 8 pages.

Kamel et al., "Hilbert R-tree: An Improved R-tree Using Fractals," PVLDB '94 Proceedings of the 20th International Conference on Very Large Data Bases, Sep. 12-15, 1994, Morgan Kaufman Publishers Inc., San Francisco, CA, USA, 1994, pp. 500-509.

Kankuzi, "A Dynamic Graph-based Visualization for Spreadsheets," University of Bostwana, Faculty of Science, Department of Computer Science, <http://www.researchgate.net/profile/Yirsaw_Ayalew2/publication/234808991_A_dynamic_graph-based_visualization_for_spreadsheets/links/00b7d51a9b5169d566000000.pdf>, Jun. 2008, 121 pages.

Kankuzi et al., "An End-User Oriented Graph-Based Visualization for Spreadsheets," Proceedings of the 4th International Workshop on End-user Software Engineering, WEUSE '08, May 12, 2008, Leipzig, Germany, ACM, 2008, pp. 86-90.

Microsoft, "Create an external reference (link) to a cell range in another workbook," Excel for Microsoft 365, Excel 2019, Excel 2016, Excel 2013, Excel 2010 Support Office, 2020, retrieved from internet at <https://support.office.com/en-us/article/create-an-external-reference-link-to-a-cell-range-in-another-workbook-c98d1803-dd75-4668-ac6a-d7cca2a9b95f> on May 5, 2020, 8 pages.

Microsoft, "Create or change a cell reference," Excel for Microsoft 365, Excel for the web, Excel 2019, Excel 2016 Support Office, 2020, retrieved from internet at <https://support.office.com/en-us/article/create-or-change-a-cell-reference-c7b8b95d-c594-4488-947e-c835903cebaa> on May 5, 2020, 8 pages.

Rothermel et al., "A Methodology for Testing Spreadsheets," ACM Transactions on Software Engineering and Methodology, Jan. 2001, vol. 10, No. 1, pp. 110-147.

Sewall et al., "PALM: Parallel Architecture-Friendly Latch-Free Modifications to B+ Trees on Many-Core Processors," Proc. VLDB Endowment, 2011, pp. 795-806.

Stanescu et al., "Using R-trees in content-based region query with spatial bounds," Seventh International Symposium on Symbolic and Numeric Algorithms for Scientific Computing (SYNASC'05), Timisoara, Romania, 2005, 7 pages.

Tang et al., "Novel DR-tree index based on the diagonal line of MBR," 2012 8th International Wireless Communications and Mobile Computing Conference (IWCMC), Limassol, Cyprus, 2012, pp. 574-579.

Yang et al., "Performance of R-Tree with Slim-Down and Reinsertion Algorithm," 2010 International Conference on Signal Acquisition and Processing, Bangalore, India, 2010, pp. 291-294.

410

```
901 ──→ frag:1388a5@b3b004857933@449c169c5180
         ---tree
          |-observations
904 ──→   | |-obv #2:7 input link
          | | |-fmt #2:7 auto 1 startID #2:6
          | | |-fmt #2:7 auto 1 stopID #2:6
          | | '-fmt #2:7 auto 1 singularObs true
906 ──→   | '-obv #2:4 input link
          |   |-fmt #2:4 auto 1 startID #2:3
          |   |-fmt #2:4 auto 1 stopID #2:3
          |   '-fmt #2:4 auto 1 singularObs true
          '-ctrl #0:0 none root
           |-ctrl #0:2 auto sof
908 ──→   | '-ctrl #2:3 input link
910 ──→   |   |-obv #2:4
          |   |-fmt #2:3 auto 1 wURI wurl://sheets.v0/0/s|..075_1-1-1-1-1864
          |   |-fmt #2:3 auto 1 vf.Type 0
          |   |-fmt #2:3 auto 1 vf.delimiterSymbol 2
          |   |-fmt #2:3 auto 1 vf.currencySymbol 5
          |   |-fmt #2:3 auto 1 vf.precision -1
          |   |-fmt #2:3 auto 1 vf.percentSymbolVisible false
          |   |-fmt #2:3 auto 1 vf.naw.showNumbersAsWords false
          |   |-fmt #2:3 auto 1 vf.naw.capitalizeFirst false
          |   |-fmt #2:3 auto 1 vf.naw.displayZeroAs
          |   |-fmt #2:3 auto 1 isProducer false
          |   |-fmt #2:3 auto 1 vf.useDashesForZero false
          |   |-fmt #2:3 auto 1 vf.hideLeadingZero false
          |   |-fmt #2:3 auto 1 vf.showPositiveSign false
          |   |-fmt #2:3 auto 1 vf.showThousandsSeparator false
          |   '-fmt #2:3 auto 1 vf.usePrecisionV2 false
911 ──→   |  '-text #2:5 input 1 " "
912 ──→   | '-ctrl #2:6 input link
914 ──→   |   |-obv #2:7
916 ──→   |   |-fmt #2:6 auto 1 wURI wurl://sheets.v0/0/sh..075_1-1-1-1-1864
          |   |-fmt #2:6 auto 1 vf.Type 0
          |   |-fmt #2:6 auto 1 vf.delimiterSymbol 2
          |   |-fmt #2:6 auto 1 vf.currencySymbol 5
          |   |-fmt #2:6 auto 1 vf.precision -1
          |   |-fmt #2:6 auto 1 vf.percentSymbolVisible false
          |   |-fmt #2:6 auto 1 vf.naw.showNumbersAsWords false
          |   |-fmt #2:6 auto 1 vf.naw.capitalizeFirst false
          |   |-fmt #2:6 auto 1 vf.naw.displayZeroAs
918 ──→   |   |-fmt #2:6 auto 1 isProducer false
          |   |-fmt #2:6 auto 1 vf.useDashesForZero false
          |   |-fmt #2:6 auto 1 vf.hideLeadingZero false
          |   |-fmt #2:6 auto 1 vf.showPositiveSign false
          |   |-fmt #2:6 auto 1 vf.showThousandsSeparator false
          |   '-fmt #2:6 auto 1 vf.usePrecisionV2 false
          '-ctrl #0:1 auto eof
```

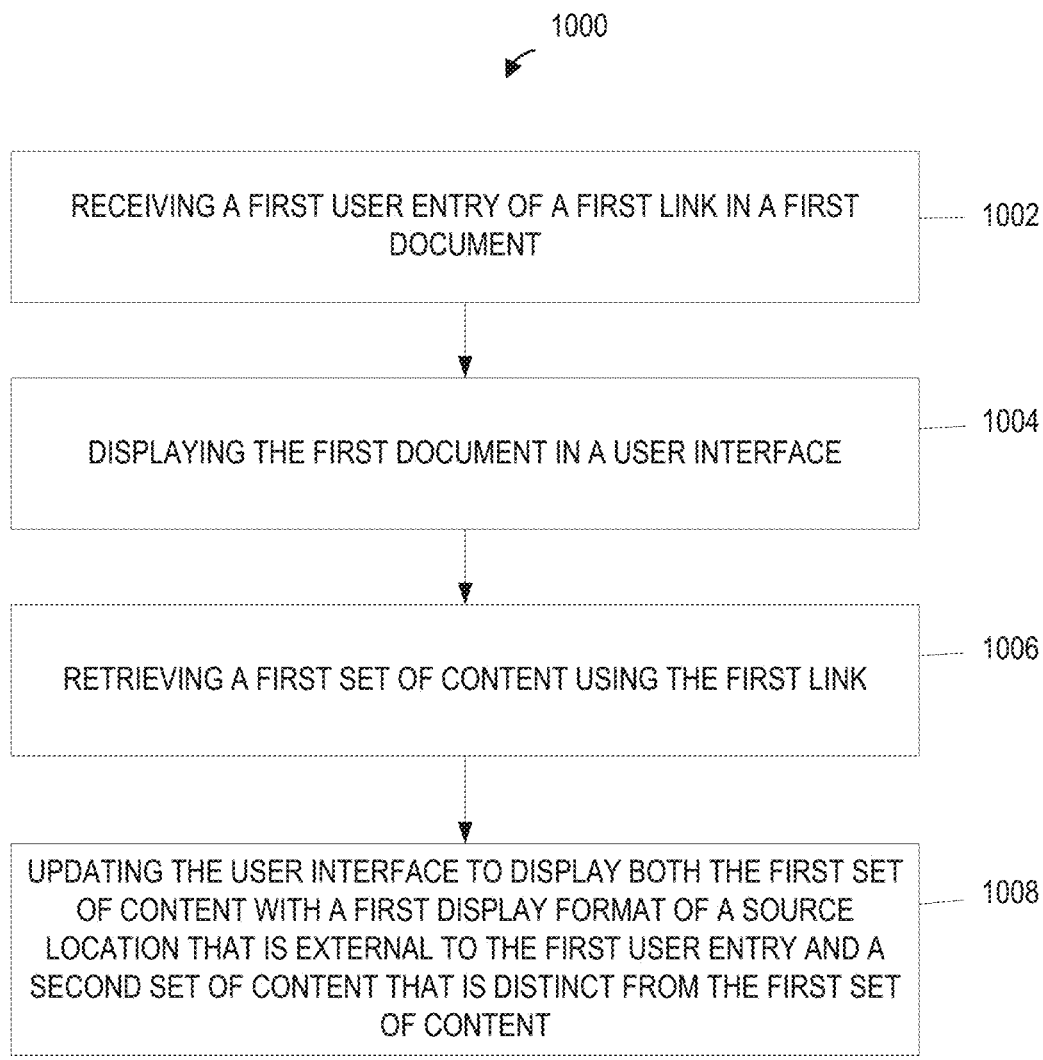

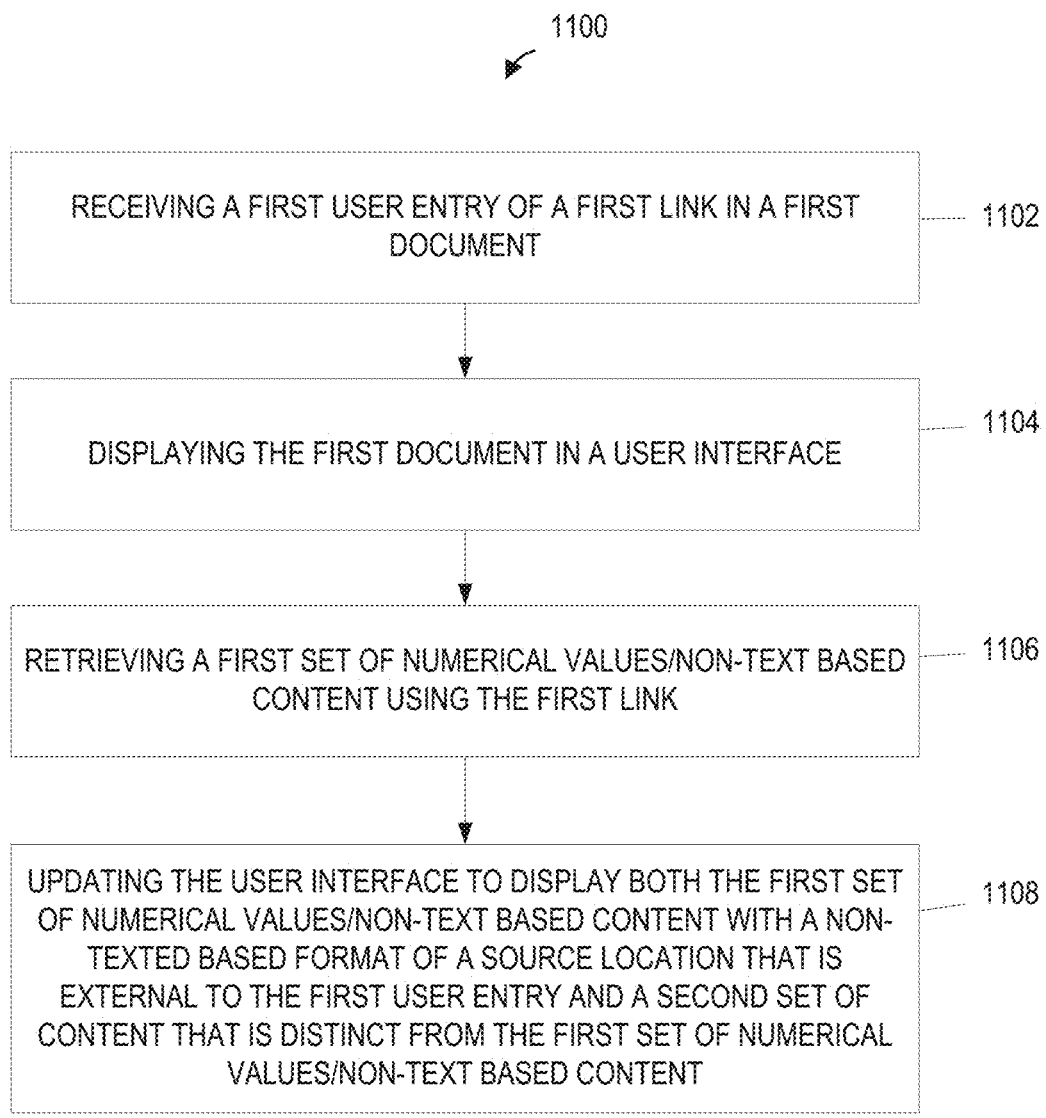

SYSTEMS, METHODS, AND COMPUTER-READABLE MEDIA FOR FLOW-THROUGH FORMATTING FOR LINKS

CROSS-REFERENCE TO RELATED APPLICATIONS

This application is a continuation of U.S. patent application Ser. No. 17/175,910, filed Feb. 15, 2021, now U.S. Pat. No. 11,100,277, which is incorporated herein by reference.

TECHNICAL FIELD

Embodiments disclosed herein generally relate to systems, methods, and computer-readable media for displaying a document based on formatting from a source, and more specifically to systems, methods, and computer-readable media for rendering linked content in displayed documents based on content and format of the content that flow from a source to a destination.

INTRODUCTION

An electronic document may include content such as text, numerical values, tables, images, etc. When that content is to be used in several different documents or at different locations within the document, it may be cumbersome and error-prone to copy the content and format of the data among the different documents and/or different locations within the document. In some scenarios, instead of copying the content to a different location and/or different document, it may be beneficial to insert a link to the content and format thereof and retrieve the content and format thereof as it is needed.

Linking may refer to the ability for content and formatting of the content in one document (or in one part of a document, spreadsheet, slide show, etc.) to automatically flow through to another document (or another part of the same document). For example, if a user takes a block of text in a document (the "source") and "links" it to a second document (the "destination"), then that block of text and format thereof shows up in the second document, and any edits to the source flow through to the destination.

As discussed in more detail below, instead of merely flowing through the "raw value" of the content (the text or numerical values), formatting information (font, size, bold, etc.) may flow through. Additionally, such formatting information may be layered-upon or overridden in the destination, as desired.

SUMMARY

According to certain embodiments, systems, methods, and non-transitory computer-readable media are disclosed for rendering linked content in a first document.

According to certain embodiments, a method for rendering linked content in a first document is disclosed. One method including: receiving, at a computing device, a first user entry of a first link in the first document, wherein the first link refers to a first set of content having a source location that is external to the first user entry; displaying, by the computing device, the first set of content with a first display format of the source location in a user interface that displays the first document, the first display format includes paragraph formatting properties for each paragraph of the first set of content, including: retrieving, by the computing device, the first set of content using the first link; and updating, by the computing device, the user interface to display both the first set of content with the first display format of the source location, and a second set of content that is distinct from the first set of content.

According to certain embodiments, a method for rendering linked content in a first document is disclosed. One method including: receiving, at a computing device, a first user entry of a first link in the first document, wherein the first link refers to a first set of content having a source location that is external to the first user entry; displaying, by the computing device, the first set of content with a first display format of the source location in a user interface that displays the first document including: retrieving, by the computing device, the first set of content using the first link; and updating, by the computing device, the user interface to display both the first set of content with the first display format of the source location, and a second set of content that is distinct from the first set of content; receiving, at the computing device, an indication that the first display format is turned on or turned off, wherein displaying the first set of content with the first display format of the source location in the user interface that displays the first document includes: displaying the first set of content with the first display format of the source location in the user interface that displays the first document when the indication that the first display format is turned on, and displaying the first set of content with a second display format of a destination location in the user interface that displays the first document when the indication that the first display format is turned off.

According to certain embodiments, a method for rendering linked content in a first document is disclosed. One method including: receiving, at a computing device, a first user entry of a first link in the first document, wherein the first link refers to a first set of non-text based content having a source location that is external to the first user entry; displaying, by the computing device, the first set of non-text based content with a non-text based format of the source location in a user interface that displays the first document, including: retrieving, by the computing device, the first set of non-text based content using the first link; and updating, by the computing device, the user interface to display both the first set of non-text based content with the non-text based format of the source location, and a second set of content that is distinct from the first set of content.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

In the course of the detailed description to follow, reference will be made to the attached drawings. The drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

FIG. 9 is a diagram of an example causal tree that includes a linking data structure, according to an embodiment.

FIG. 10 is a flowchart illustrating an example method, implemented on a server, for rendering linked content in a first document, according to an embodiment.

FIG. 11 is another flowchart illustrating an example method, implemented on a server, for rendering linked content in a first document, according to an embodiment.

Figure 1:
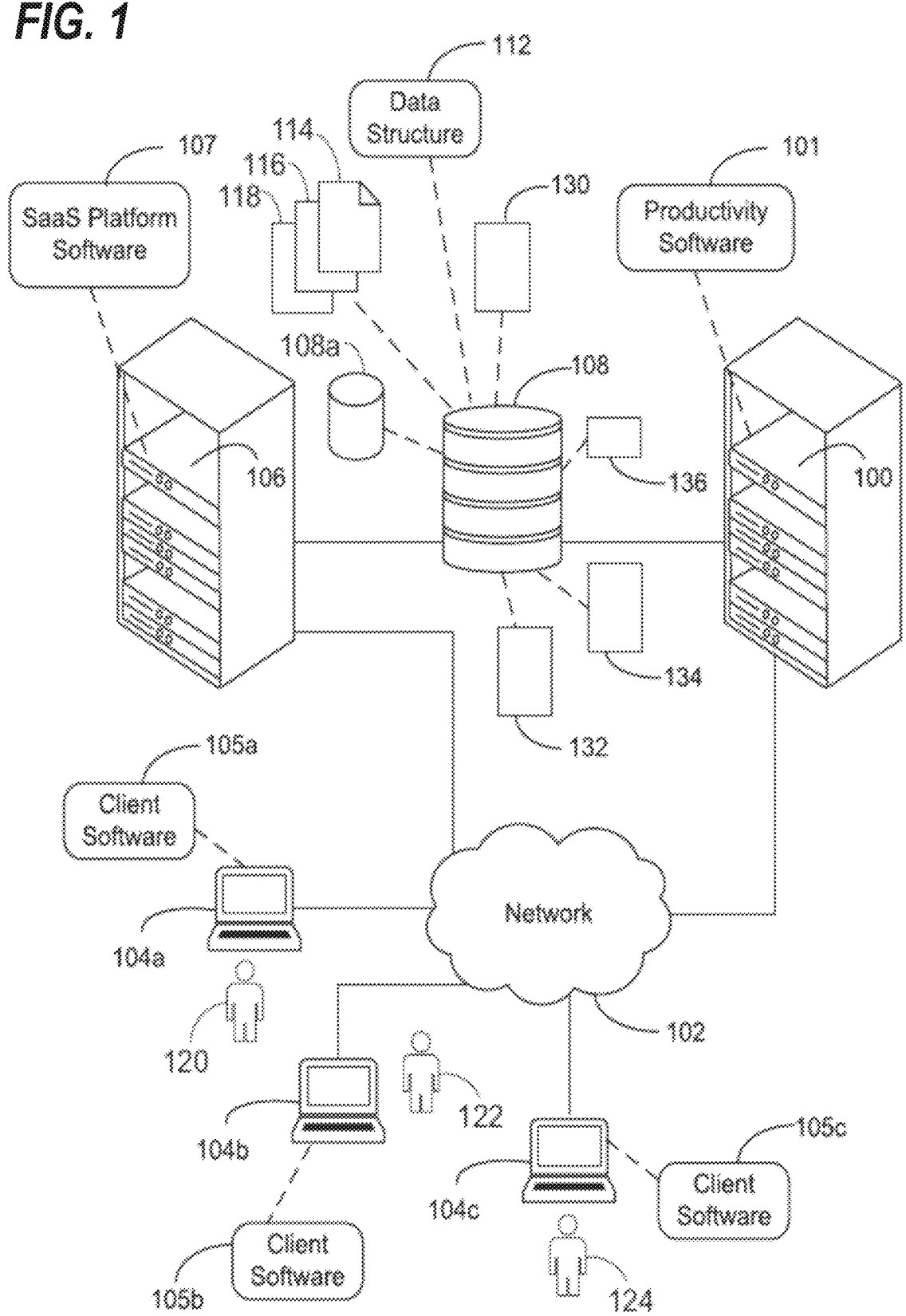
FIG. 1 is an example of a networking environment in which various embodiments of the disclosure may be implemented.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION

One skilled in the art will recognize that various implementations and embodiments of the present disclosure may be practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." Additionally, the term "or" is intended to mean an inclusive "or" rather than an exclusive "or." That is, unless specified otherwise, or clear from the context, the phrase "X employs A or B" is intended to mean any of the natural inclusive permutations. For example, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

For the sake of brevity, conventional techniques related to systems and servers used to conduct methods and other functional aspects of the systems and servers (and the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

As described herein, various embodiments relate to systems, methods, and computer-readable media for rendering linked content and formats in documents. In an embodiment, the systems, methods, and computer-readable media may be used to insert, store, and update links to external content, which has a format, in a displayed document, including but not limited to text documents, spreadsheets, content in presentations, text/graphic components in flow charts, text/graphic components in diagrams, etc. The systems, methods, and computer-readable media may also be used to insert, store, and update links made in a document by multiple users. In various embodiments, a computing device may provide a user interface to a user of a document, where the user interface may be configured to receive a user entry of a link that refers to content and a format of the content that is external to the document or the same document at a different location within the document. To display the linked content, the computing device may retrieve the content and the format of the content using the link and updates the user interface to display, within the document, both the linked content and format thereof and other content that is distinct from the linked content. Advantageously, the computing device is configured to display the linked content itself, including the formatting of the linked content, (i.e., not just the link) and the other content in an editing mode of the user interface, for example, while the user is editing the contents of the document.

Turning to FIG. 1, an example of a computer networking environment in which various embodiments of the disclosure may be implemented is shown. A first computing device 100 is communicatively linked to a network 102. Possible implementations of the network 102 include a local-area network ("LAN"), a wide-area network ("WAN"), a private network, a public network (e.g., the Internet), or any combination of these. The network 102 may include both wired and wireless components. Also communicatively linked to the network 102 may be a second computing device 104a, a third computing device 104b, a fourth computing device 104c, and a fifth computing device 106. The fifth computing device 106 may be communicatively linked to a media storage device 108 (e.g., a redundant array of independent disks). For the sake of example, it is assumed that a first user 120 may operate the second computing device 104a, a second user 122 may operate the third computing device 104b, and a third user 124 may operate the fourth computing device 104c. Each of the computing devices 104a, 104b, and 104c may execute client software (reference numerals 105a, 105b, and 105c, respectively). One possible implementation of the client software may be a web browser.

Residing within the media storage device 108 may be a database 108a containing multiple documents, three of which are depicted in FIG. 1: a first document 114, a second document 116, and a third document 118. The first computing device 100 and the fifth computing device 106 are depicted as rack-mounted servers, while the second, third, and fourth computing devices 104a, 104b, and 104c are depicted as a notebook computers. However, the computing devices depicted in FIG. 1 are merely representative. Other possible implementations of a computing device may include a desktop computer, a tablet computing, and a smartphone. Furthermore, although the first, second, and third documents 114, 116, and 118 are depicted as being stored in a single device, they may, in fact, be stored on multiple storage devices (e.g., sharded into multiple physical chunks) of a cloud storage service. Finally, there may be more than or fewer than the first, second, and third documents 114, 116, and 118 residing on the media storage device 108.

For convenient reference, the first computing device 100 will also be referred to as a "productivity server 100" and the fifth computing device 106 will be also be referred to as a "database server 106." Although depicted in FIG. 1 as separate devices, in some embodiments, the functionality of the productivity server 100 and the database server 106 may be on the same device. The productivity server 100 may execute productivity software 101 to provide document collaboration services. The database server 106 may execute Software-as-a-Service ("SaaS") platform software 107 to provide database services to the productivity software 101, such as maintaining the contents of the database 108a and providing a programming platform for various processes launched by the productivity software (e.g., to manipulate, store, and retrieve documents and other information from the database 108a). Under the control of the productivity software 101, the productivity server 100 may interact with the database server 106 (which operates under the control of the SaaS platform software 107) and the computing devices 104a, 104b, and 104c (also referred to as "client devices") to allow the computing devices to access the first document 114, the second document 116, and the third document 118 so that the first user 120, the second user 122, and the third user 124 may collaborate in editing the documents (e.g., moving sections around in a particular document).

In an embodiment, documents maintained on the media storage device 108 may be organized into one or more sections, with each section (e.g., the contents of the section) being maintained in its own separate data structure referred to as a "section entity." For example, the first document 114 in FIG. 1 may have a first section represented by a first section entity 130, a second section represented by a second section entity 132, and a third section represented by a third section entity 134. The productivity software 101 may use an outline entity 136 (also stored on the media storage device) to determine how the sections are organized. As will be described below, the outline entity 136 may be implemented as a causal tree.

Figure 2:
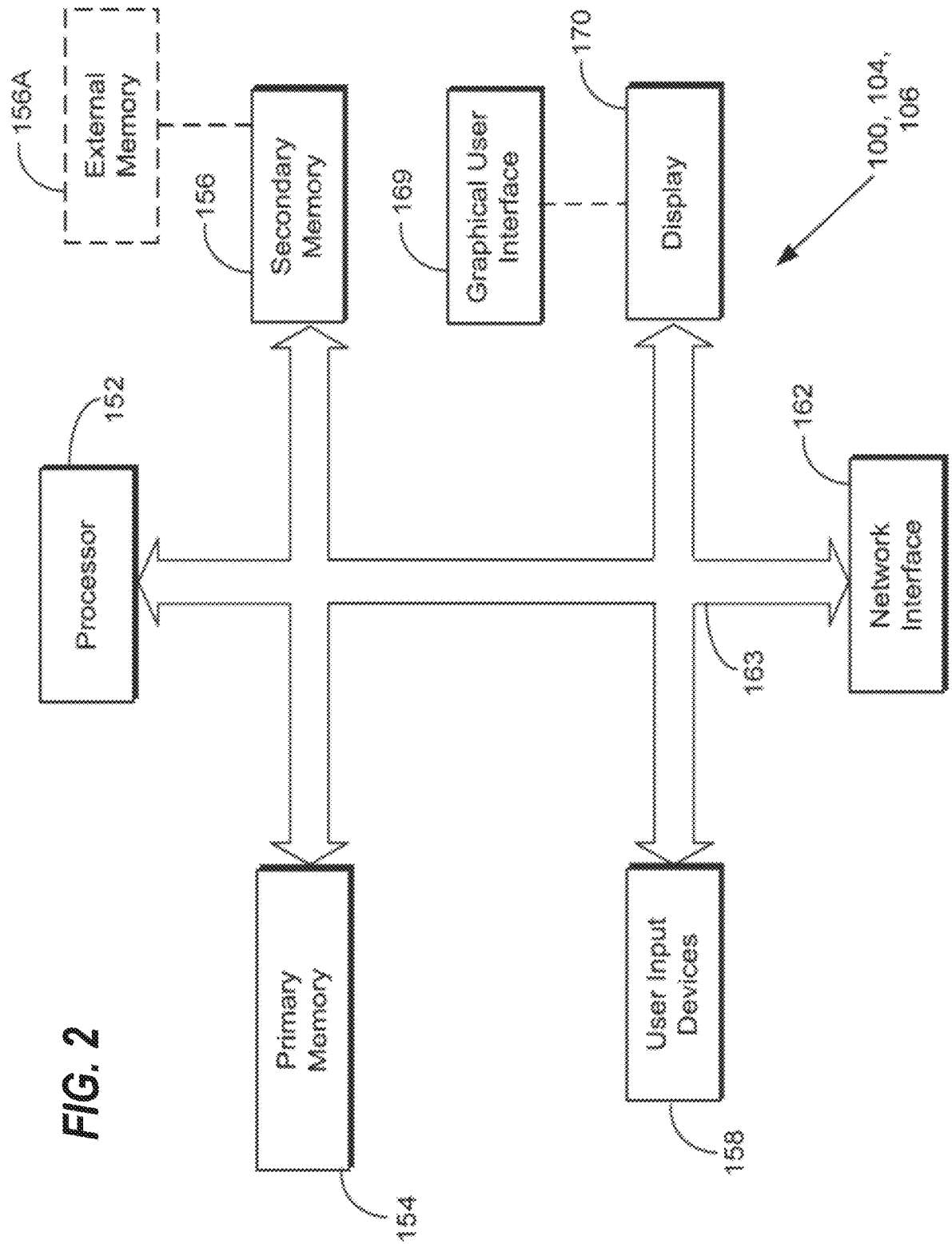
FIG. 2 is a block diagram of a computing device, according to an embodiment.

FIG. 2 is a block diagram of a computing device, according to an embodiment. One or more of the computing devices of FIG. 1 (including the media storage device 108) may have the general architecture shown in FIG. 2, in various embodiments. The device depicted in FIG. 2 may include a processor 152 (e.g., a microprocessor, controller, or application-specific integrated circuit), a primary memory 154 (e.g., volatile memory, random-access memory), a secondary memory 156 (e.g., non-volatile memory, solid state drive, hard disk drive), user input devices 158 (e.g., a keyboard, mouse, or touchscreen), a display 160 (e.g., an organic, light-emitting diode display), and a network interface 162 (which may be wired or wireless). The memories 154 and 156 may store instructions and data. The processor 152 may execute the instructions and use the data to carry out various procedures including, in some embodiments, the methods described herein.

Each of the elements of FIG. 2 may be communicatively linked to one or more other elements via one or more data pathways 163. Possible implementations of the data pathways 163 may include wires, conductive pathways on a microchip, and wireless connections. In an embodiment, the processor 152 may be one of multiple processors in the computing device, each of which is capable of executing one or more separate threads. In an embodiment, the processor 152 may communicate with other processors external to the computing device in order to initiate the execution of different threads on those other processors.

The term "local memory" as used herein may refer to one or both the memories 154 and 156 (i.e., memory accessible by the processor 152 within the computing device). In some embodiments, the secondary memory 156 may be implemented as, or supplemented by an external memory 156A. The media storage device 108 may be a possible implementation of the external memory 156A. The processor 152 may execute the instructions and use the data to carry out various procedures including, in some embodiments, the methods described herein, including displaying a graphical user interface 169. The graphical user interface 169 may be, according to one embodiment, software that the processor 152 executes to display a report on the display device 160, and which permits a user to make inputs into the report via the user input devices 168.

The computing devices of FIG. 1 (i.e., the processor 152 of each of the computing devices) may be able to communicate with other devices of FIG. 1 via the network interface 162 over the network 152. In an embodiment, this communication may take place via a user interface that the productivity server 150 may provide to the computing devices 154a, 154b, and 154c. The specific nature of the user interface and what the user interface shows at any given time may vary depending what the user has chosen to view. Also, multiple users may interact with different instances of the user interface on different devices. In some embodiments, the productivity server 150 may carry out calculations to determine how content and format thereof is to be rendered on a computing device, generates rendering instructions based on those calculations, and transmits those rendering instructions to the computing device. Using the received instructions, the computing device may render the content and format thereof on a display. In other embodiments, the productivity server 150 may transmit instructions regarding an asset to a computing device. In carrying out the received instructions, the computing device may perform the appropriate calculations locally to render the content and format thereof of the asset on a display.

Causal tree structures are useful representations of how content, format of the content, and metadata associated with the content are organized. For example, a document may be represented by a single causal tree structure or a bounded set of causal tree structures. The causal tree structure is useful in efficiently tracking and storing changes made in the document. A typical causal tree structure may include nodes of the editing instructions in the document, and each editing instruction may have a unique identifier or ID. The editing instructions may include, for example, text characters, insertion of text characters, deletion of text characters, formatting instructions, copy and paste, cut and paste, etc. In other words, a causal tree structure may be a representation of all the instructions (regardless of type) that compose a document. The causal tree structure may start with a root node and a collection of observation instances, from which all other instruction nodes branch. Except for the root node and observations, each editing instruction in the document may be caused by whichever editing instruction that came before it. Every editing instruction may be aware of the ID of its parent instruction, i.e., the instruction that "caused" it. In an embodiment, each instruction (other than the root node and observations) in the document may be represented as a 3-tuple: ID (ID of the instruction), CauseID (ID of the parent instruction), and Value (value of the instruction). Observations may have a 3-tuple: ID (ID of the instruction), Start ID (ID of the first character in a range), and Stop ID (ID of character immediately after the last character in a range unless the same as the Start ID which indicates only a single character is to be observed). Additional instructions may be added to an observation to provide additional information or to modify the range being observed. An example causal tree structure is shown in FIG. 9.

Figure 3A:
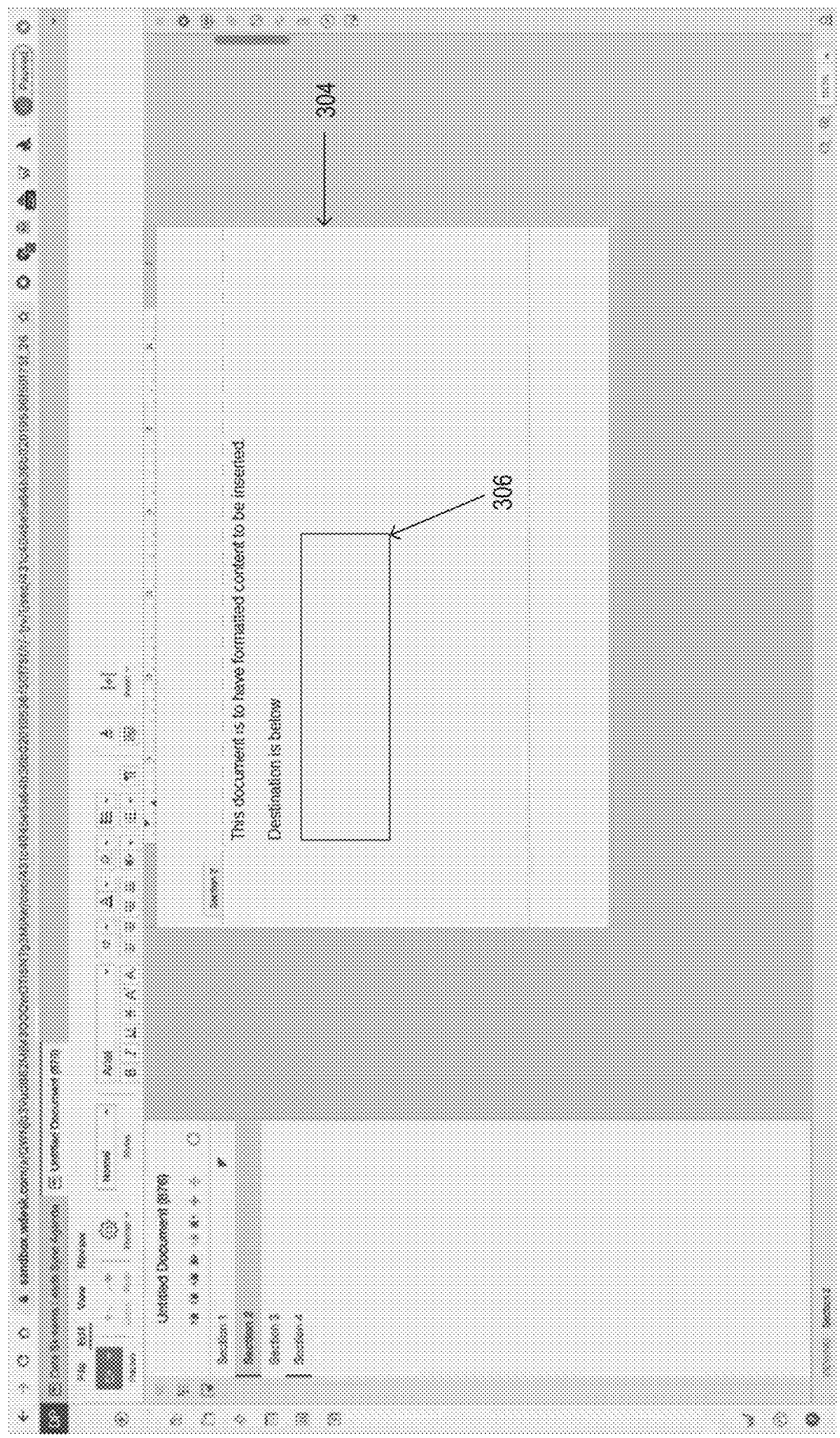
FIG. 3A is a screen shot diagram of a user interface illustrating a first document, according to an embodiment.
Figure 3B:
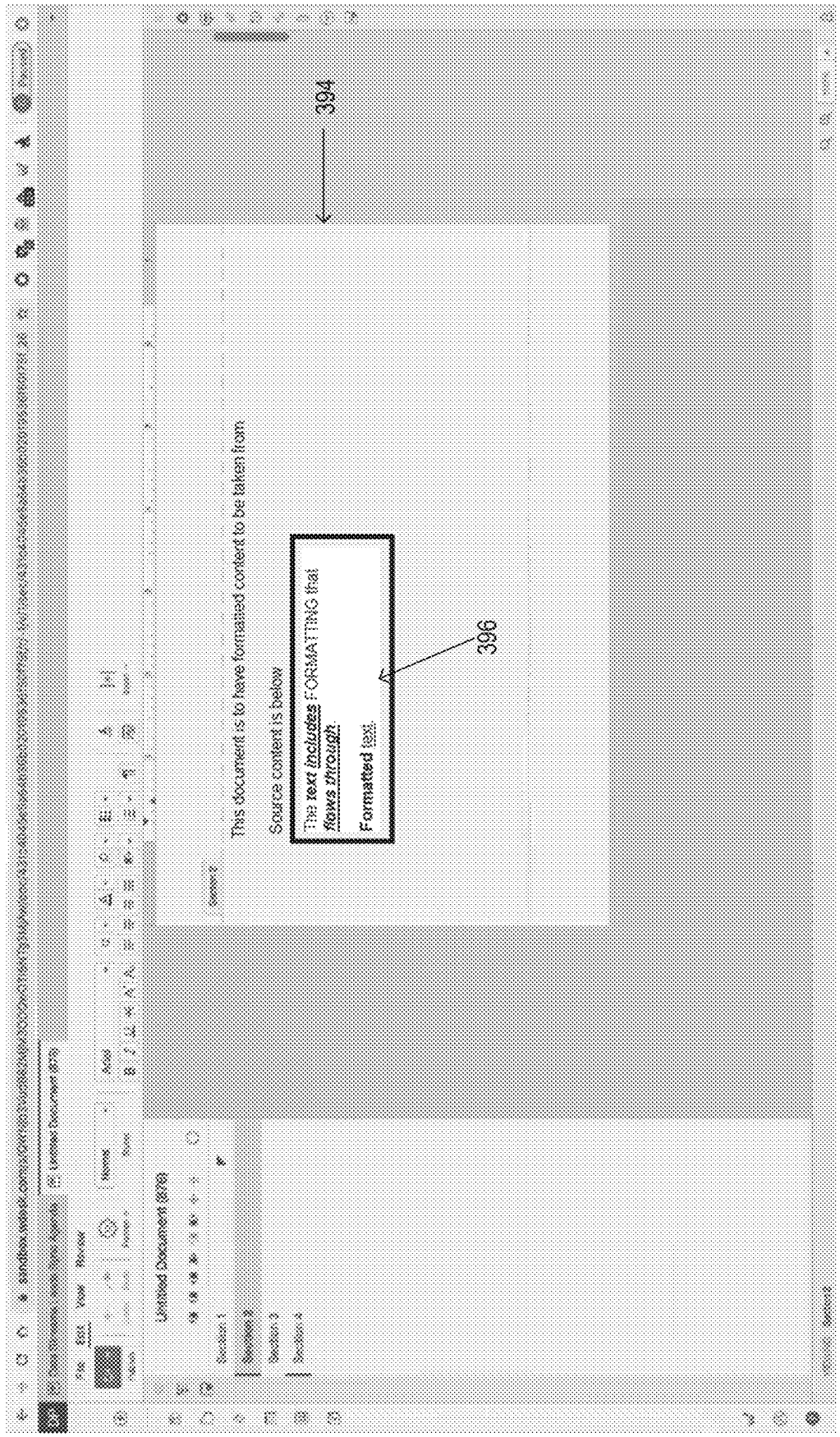
FIG. 3B is a screen shot diagram of a user interface illustrating a second document having a first set of content and formatting of the content to be linked to the first document of FIG. 3A, according to an embodiment.
Figure 3C:
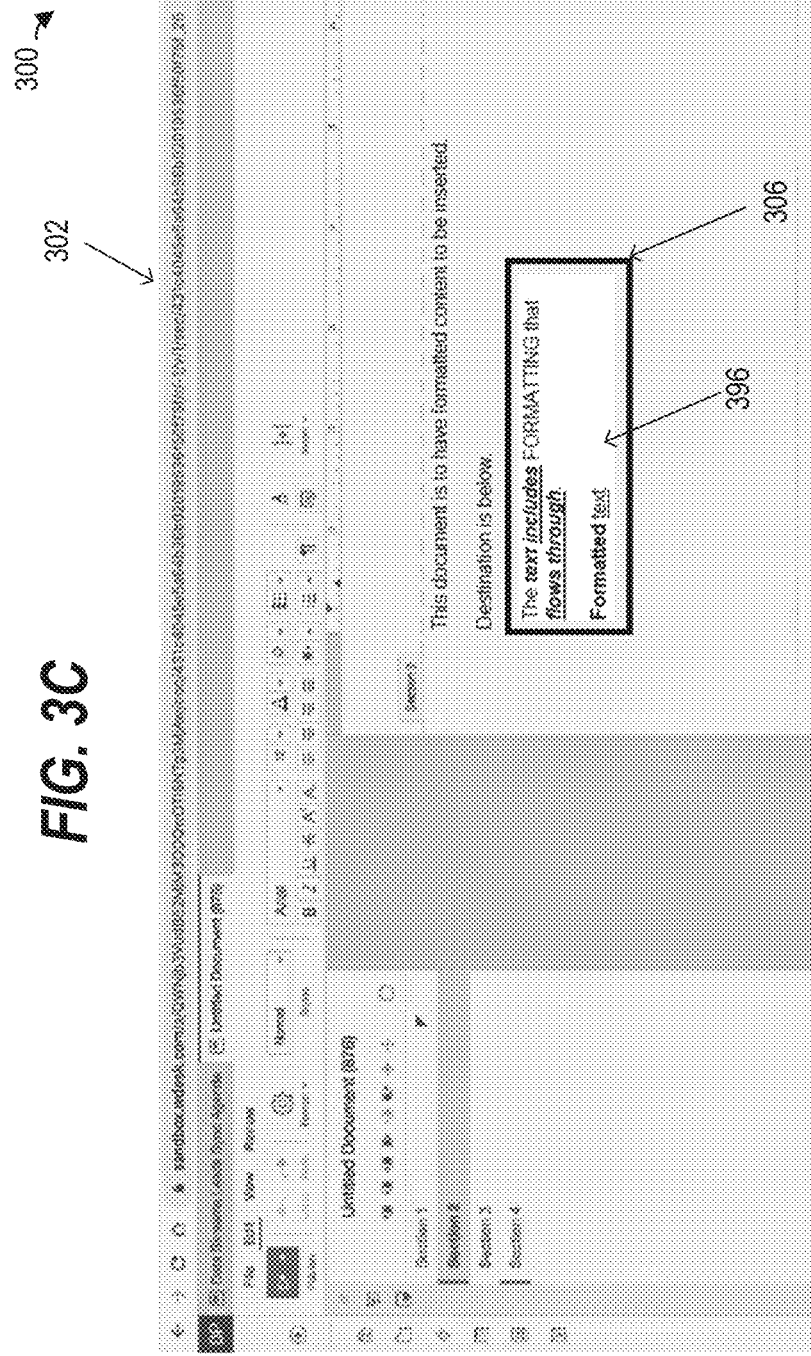
FIG. 3C is a screen shot diagram of a user interface illustrating the first document of FIG. 3A with the first set of content and formatting of the content from the second document of FIG. 3B, according to an embodiment.

FIGS. 3A-3C depict an exemplary working environment 300 rendering linked content in displayed documents based on content and format of the content that flow from a source to a destination, according to an embodiment. FIG. 3A is a screen shot diagram of a user interface 302 illustrating a portion of a first document 304 having a link for formatted content to be inserted, according to an embodiment. FIG. 3B is a screen shot diagram illustrating a user interface 392 illustrating a portion of a second document 394 having a first set of content 396 to be linked to the first document 304 of FIG. 3A, according to an embodiment. FIG. 3C is a screen shot diagram of a user interface 302 illustrating the first document 304 of FIG. 3A with the first set of content and formatting thereof linked from the second document 394 of FIG. 3B, according to an embodiment. In various embodiments, the first document 304 may be displayed within the user interface 302 to a user, for example, within the client software 105a on the computing device 104a to the user 120. Similarly, the second document 394 may be displayed within the user interface 392 to the user 120 within the client software 105a. In some scenarios, the first document 304 and/or second document 394, or respective portions thereof, may be displayed to different users within several different user interfaces on different computing devices, for example, client software 105b and 105c and computing devices 104b and 104c.

In the example shown in FIG. 3A, the first document 304 may be a text document and the user interface 302 may display the text document. In the example shown in FIG. 3B, the second document 394 may also be a text document and the user interface 392 may display the text document. In other embodiments, the first document 304 and/or second document 394 may be a text document, a spreadsheet, content in a presentation, text and graphic components in a flow chart, text and graphic components in a diagram, etc., but for clarity and conciseness, FIGS. 3A and 3B depict only a portion of the documents. In the embodiments described herein, for explanatory purposes, a portion of the first document 304 into which a user inserts linked content may be referred to herein as a "destination" or "destination location." Although a portion of a document into which linked content may be inserted, in other embodiments, the portion of the document is i) a paragraph or other element of a document that contains text, ii) a field or text box of a presentation, iii) or other suitable portion of a document.

The linked content may be content from a different location, for example, a different location within the first document 304 or a location that is external to the first document 304. For example, the linked content may be content that is part of another document, for example, a text document, a spreadsheet, content in a presentation, text and graphic components in a flow chart, text and graphic components in a diagram, etc. Rather than have the same content manually entered and updated in different locations, which increases a likelihood of error and inconsistent values, linked content may be utilized to pull the content and formatting thereof directly from a single source when the first document 304 is to be displayed. As used herein, a link may be a reference, pointer, or data structure that refers to the linked content (or the location of the linked content), while the linked content may be a set of content, for example, a set of one or more characters or numbers, a set of one or more sentences, a set of one or more paragraphs, a set of one or more cells within a spreadsheet, a set of one or more images, or various combinations thereof. In an embodiment, the linked set of content contains a plurality of elements (i.e., characters, paragraphs, etc.) that appear consecutively within a document, for example, sentences one through five of a text document or cells of a spreadsheet. In another embodiment, the linked set of content may include a plurality of elements that do not appear consecutively.

Referring to FIGS. 3A and 3B, the user 120 may edit a portion of the first document 304 to include a first link at a location 306, referred to herein as link 306. The link 306 may refer to a first set of content 396 that is external to the location 306 (in this example, within the second document 394), according to an embodiment. The second computing device 104a may receive a first user entry of the first link 306 in the document, for example, via the client software 105a. In various embodiments, the client software 105a may be configured to provide a user interface where the user 120 i) may select a destination location within the first document 304 at which the first link 306 is to be processed (i.e., a location where the linked content should be inserted), and ii) may select a source location of the first set of content from which the linked content should be retrieved. Although the description herein refers to selecting the destination location before the source location, in other embodiments, the user may select the source location before selecting the destination location. In an embodiment, the client software 105a may provide a user interface where the user 120 performs a gesture at a location within the first document 304 (e.g., a right-click of a mouse button, a "shift" or "control" click, a keyboard shortcut, etc.) where the first link 306 should be inserted and a menu is provided (e.g., pop-up menu, drop-down menu, etc.) with an option to insert the link. The user may then navigate to the desired document and may select (e.g., click), highlight (e.g., click and drag), or otherwise identify the first set of content, specifically, the text of "The text includes FORMATTING that flows through." and "Formatted text" and formatting thereof in document 394. In this way, the user may not have to manually edit the document to write in content and formatting thereof.

FIG. 3C is a screen shot diagram of a user interface 302 illustrating the first document 304 of FIG. 3A with the first set of content 396 and formatting thereof linked from the second document 394 of FIG. 3B, according to an embodiment. In various embodiments, the first document 304 may be displayed within the user interface 302 to a user, for example, within the client software 105a on the computing device 104a to the user 120. In the user interface 302 of FIG. 3C, computing device 104a may display the content and formatting thereof in the first document 304 with the linked content. In an embodiment, the computing device 104a may retrieve the first set of content 396 from the second document 394 (e.g., from the media storage device 108) using the first link 306 and may update the user interface 302 to display the first set of content 396 and formatting thereof within the first document 304 as linked content 308.

As shown in FIGS. 3B and 3C, the display format of the first set of content as shown in the source location is the same as the display format of the first set of content as shown in the destination location. In various embodiments, the computing device 104a may also be configured to provide a user interface that allows the user to flow through all of or parts of the display format associated with the first set of content (and other elements in the documents) and provide separate display formats for the destination locations. In some scenarios, each destination location of a set of content may have a different display format from the other destination locations.

In some embodiments, the computing device 104a may be configured to display the first set of content, as well as other linked content, with a display format that includes a link indicator adjacent to the first set of content. The link indicator may provide a visual indication in the user interface 302 that the first set of content is linked from a source location that is external to the first document 304. In the embodiment shown in FIG. 3C, the link indicator is shown as a box surrounding of the first set of content. In other embodiments, another suitable link indicator is used, for example, underlining, a different font color or font face, a different background color, etc. In an embodiment, the link indicator may be an underline when the set of content is a numerical value and is a box that surrounds the set of content when the set of content is a text value.

Once a computing device 104a displays the content and formatting thereof in the first document 304 with the linked content and format thereof, as shown in the user interface 302 of FIG. 3C, such formatting information may be layered-upon or overridden. Further, in embodiments, for example, a format at the source may be defined as using green text and a format at the destination may be defined as using red text. An editor at the source may allow the format to flow through, but add an override of the text color, so that the text at the destination shows up as green (though all other aspects of the destination version of the text remain consistent with format of the source except those at the destination that have been subsequently overridden). Alternatively, an editor at the destination may allow the format to flow through, but add an override of the text color, so that the text at the destination shows up as red (though all other aspects of the source version of the text remain consistent with format of the source).

In various embodiments, the client software 105a may be configured to allow the user 120 to edit the linked content 306 and also one or more second sets of content, where the second sets of content may be text, numbers, other linked content (i.e., from a different source location), or other suitable content. In an embodiment, the computing device 104a may retrieve the first set of content 396 from the second document 394 using the first link 306, may retrieve a second set of content using a second link, and may update the user interface 302 to display the second linked content and the second set of content. Generally, the second set of content may be distinct from the first set of content. In an embodiment, the remaining text in the document may be stored as a single string of text and the linked content is displayed interleaved with the single string during rendering. In another embodiment, the remaining text in the document may be stored as separate strings that separate each of the linked sets of content and are concatenated during rendering. In yet another embodiment, the content and formatting may be stored as a causal tree, as described below with respect to FIG. 9.

Figure 4:
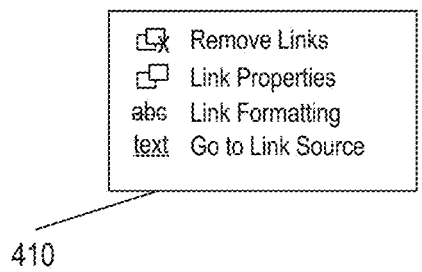
FIG. 4 is a screen shot diagram illustrating a link dialog box, according to an embodiment.

FIG. 4 is a screen shot diagram illustrating a link dialog box 410, according to an embodiment. The link dialog box 410 may provide options to a user for managing existing links within a document, for example, removing links within the document ("Remove Links"), displaying more detailed link properties ("Link Properties"), displaying options for changing the display format of the links ("Link Formatting"), and updating the user interface to display the document that contains the source location for a link ("Go to Link Source").

Figure 5:
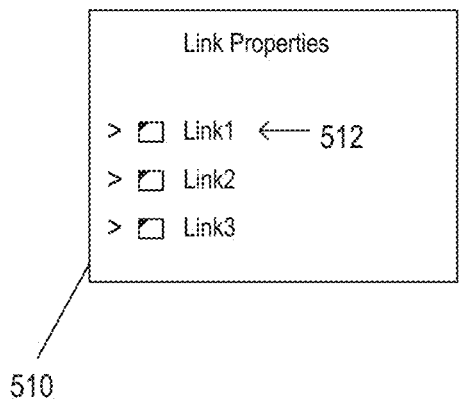
FIG. 5 is a screen shot diagram illustrating a link properties box, according to an embodiment.

FIG. 5 is a screen shot diagram illustrating a link properties box 510, according to an embodiment. The client software 105a displays the link properties box 510 after a user has selected the "Link Properties" option shown in FIG. 4. The link properties box 510 may display a list of the sets of linked content within a selected document. The link properties box 510 may provide an improved visualization of the linked content within the document, for example, by omitting the surrounding text that may obscure the display format of the linked content. In an embodiment, each entry in the list may be selectable to provide a drop-down menu with more detail of the selected entry.

Figure 6:
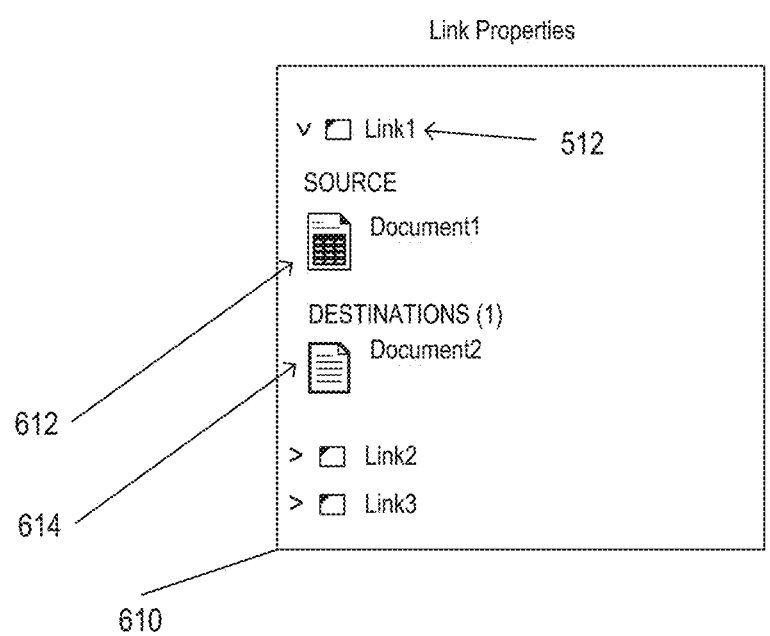
FIG. 6 is a screen shot diagram illustrating the link properties box of FIG. 5, according to an embodiment.

FIG. 6 is a screen shot diagram illustrating the link properties box 510 of FIG. 5, according to an embodiment. In the example shown in FIG. 6, a user has selected an entry 512 of FIG. 5, after which the client software 105a displays the link properties box 610 with more detail of the entry 512 (the text content corresponding to the first set of content 396). The link properties box 610 includes a source link 612 and a destination link 614. The source link 612 includes a document name of the source location, a document element of the source location, a section name of the source location, and an icon that indicates a document type of the source location. In other embodiments, additional or fewer details are provided in the source link 612, for example, source formatting, last edited time, or other suitable details. In some embodiments, the client software 105a is configured to include a link (e.g., a universal resource locator) to the source location in the source link 612 that allows the user to quickly open the source document (e.g., in a separate window).

The destination link 614 includes a list of documents in which the content 396 appears. In the embodiment shown in FIG. 6, only a single destination location is shown, but in other embodiments where a set of content is linked from multiple different documents, those additional documents are shown. The destination link 614 includes a document name of the destination location, a document element of the destination location, a section name of the destination location, and an icon that indicates a document type of the source location (e.g., spreadsheet, text document, presentation, etc.). In other embodiments, additional or fewer details are provided in the destination link 614, for example, source formatting, last updated time, or other suitable details.

Figure 7:
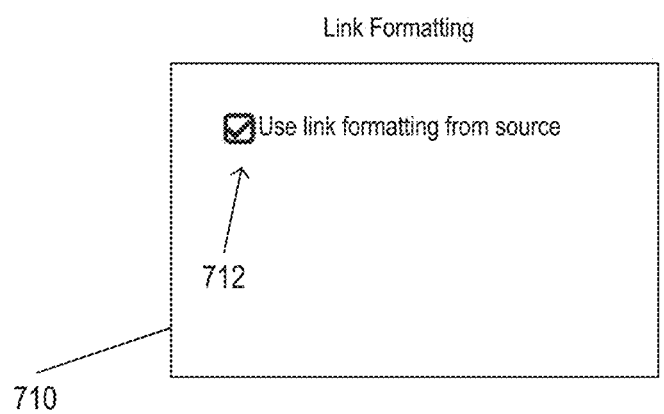
FIG. 7 is an exemplary link formatting properties box, according to an embodiment.

In embodiments of the present disclosure, flow through of formatting of the content may be turn on and turned off at one or both of the source and the destination. For example, when flow through of formatting is turned on, the content and formatting of the content of a source may flow through to the destination. When flow through of formatting is turned off, the content, but not the formatting of the content, of the source may flow through the destination. FIG. 7 depicts an exemplary link formatting properties box of a user interface that allows the turning on and turning of flow through of formatting. As shown in FIG. 7, the link formatting properties box 710 may include a check box 712 that allows for the turning on and turning of flow through of formatting of content. In other embodiments, additional or fewer options/details may be provided in the link formatting properties box 710, for example, last edited time or other suitable details. Additionally, link formatting properties box 710 may include a plurality of check boxes with each check box representing a formatting type to flowed through from a source to a destination that may be turned on or turned off. For example, there may be a check box for each of the following formatting properties bold, italic, underline, strikethrough, superscript, subscript, font family, font size, text color, text highlight, style key, widow orphan control, keep with next, keep lines together, indentation, spacing, list formatting, etc.

Figure 8A:
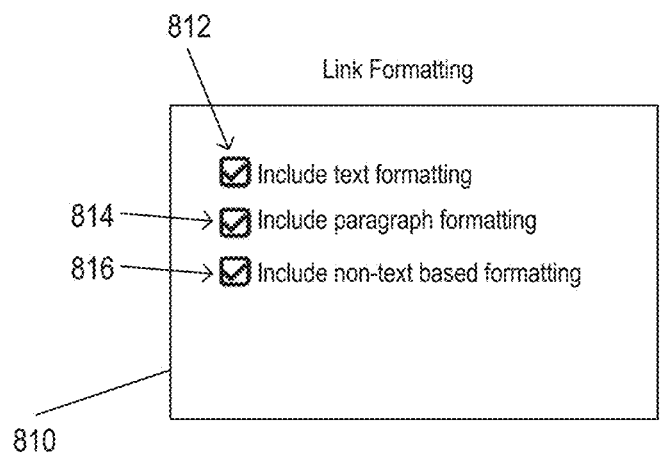
FIG. 8A is an exemplary link formatting properties box, according to an embodiment.

FIG. 8A depicts an exemplary link formatting properties box of a user interface that allows the turning on and turning of flow through of text formatting properties and/or paragraph formatting properties. As shown in FIG. 8A, the link formatting properties box 810 may include a check box 812 that allows for the turning on and turning off flow through of text formatting properties of content and a check box 814 that allows for the turning on and turning of flow through of paragraph formatting properties of content. For example, the check box for text formatting properties may turn on or turn off the flow through of text formatting properties, such as, but not limited to, bold, italic, underline, strikethrough, superscript, subscript, font family, font size, text color, text highlight, style key, and the check box for paragraph formatting properties may turn on or turn off the flow through of paragraph formatting properties, such as, but not limited to, widow orphan control, keep with next, keep lines together, indentation, spacing, list formatting, bullet points, etc. Alternatively, link formatting properties box 810 may include only one of check box 812 that allows for the turning on and turning of flow through of text formatting properties of content or check box 814 that allows for the turning on and turning of flow through of paragraph formatting properties of content.

Figure 8B:
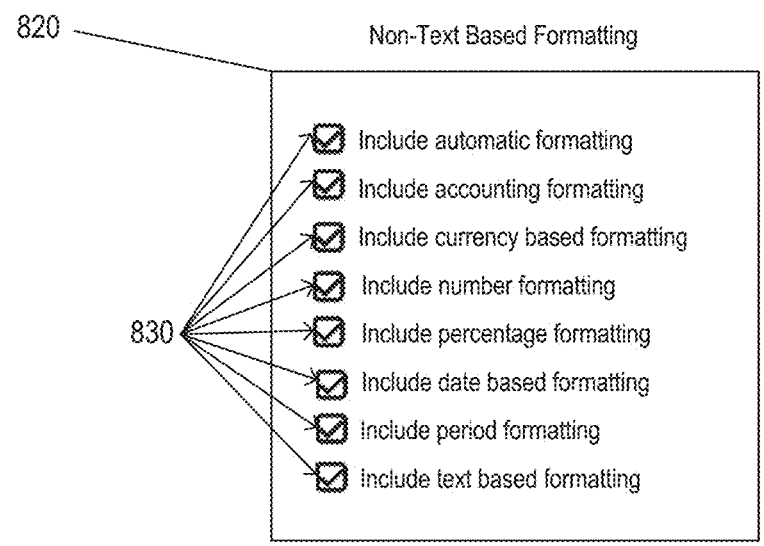
FIG. 8B is an exemplary non-text based formatting properties box, according to an embodiment.

FIG. 8B depicts an exemplary non-texted based formatting properties box of a user interface that allows the turning on and turning of flow through of non-text based formatting properties. Non-text based content may include numerical content and/or numerical values. When the set of content includes non-text based content, such as numerical content and/or a numerical value, such as a numerical value in a cell of a spreadsheet, the non-text based content may have non-text based formatting properties. Non-text based content may may be displayed as, for example, "74," "seventy-four," "74 million," etc. Thus, for further example, a non-text based content of a value of 74 may be displayed as "seventy-four" or "$74.00" based on the non-texted based formatting properties. Moreover, a non-text based content of a value of 0.5 may be displayed as, for example, 50% when the value has a non-text based formatting property of percent formatting. As shown in FIG. 8B, non-text based formatting properties may include automatic, accounting, currency, number, percent, date, period, text, etc. Automatic formatting may include no specific number format. Accounting formatting may include settings that line up a currency symbol and decimal points in a column. Currency formatting may include settings for general monetary values. Number formatting may include settings for general display of numbers. Percent formatting may include settings that multiply a value by 100 and display the results with a percentage symbol. Date formatting may include settings that display date serial numbers as date values. Period formatting may include settings display time serial numbers as time values. Text formatting may include settings to treat numerical values as text. As shown in FIG. 8B, non-text based formatting properties box 820 may include a plurality of check boxes 830 that allows for the turning on and turning of flow through of each particular non-text based formatting properties of content. Alternatively, as shown in FIG. 8A, link formatting properties box 810 may include a check box 816 that allows for the turning on and turning of flow through of non-text based formatting properties of content.

FIG. 9 is a diagram of an example symbolic representation of a causal tree 900 that includes a linking data structure, according to an embodiment. The causal tree 900 may itself be a data structure that comprises a sequence of editing instructions associated with a particular cell or other document element. In some embodiments, each editing instruction may be assigned an identifier unique to such editing instruction. For example, when the client software 105a receives a user editing instruction for a document (e.g., the document 304), the user editing instruction may be assigned an identifier that is unique to the user editing instruction and the user editing instruction may be stored as an additional node to the causal tree 900. In an embodiment, a set of content may include a plurality of alphanumeric characters that are collectively represented in the causal tree 900 as a single character that is replaced by the plurality of alphanumeric characters when displayed in the user interface. In the embodiment shown in FIG. 9, various editing instructions may be organized as "characters" and may be assigned an identifier, for example, an observation character 904 ("obv") may have an identifier "#2:7", a text character 911 may have an identifier "#2:5", a control character 912 ("ctrl") may have as an identifier "#2:3", and so on.

In some embodiments, a document element may be stored in the media storage device 108 with a fragment number value that corresponds to a fragment number 901 that identifies the causal tree 900. In other embodiments, the causal tree 900 may itself be stored within the document element in the media storage device 108. When rendering a document, the client software 105a may obtain the causal tree 900 for the document element and may traverse the tree to render that particular document element.

In the present disclosure, when the user 120 enters a user entry of a first link, for example, the first link 306 to the first content 396, the client software 105a may be configured to insert a uniform resource identifier (URI), which identifies a source location of the first set of content 396, into the causal tree that represents a history of edits, according to an embodiment. In other embodiments, a different resource locator may be utilized. When inserting the first URI into the causal tree, the client software 105a may be configured to insert a first linking data structure configured to identify i) the first link, ii) the first set of content, and iii) a destination location within the first document at which the first link is to be processed. The first linking data structure may be associated with an external linking system configured to monitor changes to source locations and destination locations. In an embodiment, for example, the productivity server 100 may include the external linking system and may be configured to monitor changes to the source locations and destination locations.

The causal tree 900 may include two observation instances 904 and 906. The observation instance 904 may include an identifier (#2:7), a start character identifier (#2:6), and a stop character identifier (#2:6). In this example the start identifier and stop identifier may identify a control character 912 within the causal tree that represents the linked content associated with a link 306 (i.e., a destination location within the document). The start and stop identifiers may observe a range of characters or a single character such as the example case 900 for a link. Specifically, the control character 912 may have a character identifier (#2:6) that corresponds to the start identifier of the observation instance 904. The control character 912 may be a link character that corresponds to a first link, for example, the first link 306. The control character 912 may further include a reference indicator 914 to the corresponding observation (obv #2:7), a URI 916 that identifies the source location of the linked content, and one or more formatting characters 918 that identify a display format of the linked content. In an embodiment, when rendering a document element, the observation instances 904 and 906 may be provided to the external linking system to indicate that any changes to the associated characters should be provided for updating the user interface. In some embodiments, the client software 105a may receive a notice of a change to the first set of content and/or format thereof from the external linking system and may automatically update the user interface to display the change to the first set of content and/or format thereof. In an embodiment, for example, the external linking system may send the updated content and/or format thereof directly to the client software 105a when the change occurs. In another embodiment, for example, the external linking system may send the notice without the updated content and/or format thereof and the client software 105a may subsequently send a request for the updated content.

FIG. 10 is a flowchart illustrating an example method 1000, implemented on a server, for rendering linked content in a first document, according to an embodiment. In some embodiments, the method 1000 is implemented by the productivity server 100 of FIG. 1, which interacts with the database server 106 and the client devices 104. FIG. 10 is described with reference to FIG. 1 for explanatory purposes. In other embodiments, however, the method 1000 is implemented by another suitable computing device.

At block 1002, a first user entry of a first link in a first document is received by a computing device. The first link refers to a first set of content having a source location that is external to the cell. In an embodiment, the first link corresponds to the first link 306 (FIG. 3A) and the first set of content is the first content 396 of the document 394 (FIG. 3B). In some embodiments, inserting a link is functionally different from copying and pasting content. For example, instead of a user manually editing the document to write in a content from another location, a user merely selects the location at which the linked content should be inserted, indicates that a link is desired (e.g., with a gesture or right-click), and selects the content to be linked. Advantageously, the user does not need to have knowledge of the content from another location and any underlying code or data structure that supports the reference is not visible to the user.

At block 1004, the cell is displayed in a user interface that displays the first document in a format of the content at a source location. In an embodiment, the first document corresponds to the first document 304 shown in FIG. 3C and the user interface corresponds to the user interface 302. In an embodiment, displaying the first document includes displaying the first document in an editing mode of the user interface, including updating the user interface to display both the first set of content with the first display format of the source location and the second set of content without displaying the first link within the cell while in the editing mode of the user interface (i.e., without displaying a formula or data structure that causes the linked content to be retrieved). As an example, the editing mode is a mode where the user is actively able to change the content and a format of the content by providing input, for example, by typing in numbers on a keyboard (i.e., input device 158).

At block 1006, the first set of content is retrieved using the first link. In an embodiment, for example, the client software 105a is configured to retrieve the content 396 from the media storage device 108. In some scenarios, the first set of content is retrieved from the first document, for example, in a different location or section of the first document. In other scenarios, the first set of content is retrieved from a second document that is different from the first document. The second document may be, for example, a text document, spreadsheet document, presentation document, or other suitable document.

At block 1008, the user interface is updated to display both the first set of content with the first display format of the source location and a second set of content that is distinct from the first set of content. In an embodiment, for example, the user interface 302 of FIG. 3A is updated to the user interface 302 of FIG. 3C to display the first content 396 along with the second set of content, which may be the non-linked content. In some embodiments, the method 1000 also includes receiving a notice of a change to the first set of content and automatically updating the user interface to display the change to the first set of content.

FIG. 11 is a flowchart illustrating an example method 1100, implemented on a server, for rendering linked content in a first document, according to an embodiment. In some embodiments, the method 1100 is implemented by the productivity server 100 of FIG. 1, which interacts with the database server 106 and the client devices 104. FIG. 11 is described with reference to FIG. 1 for explanatory purposes. In other embodiments, however, the method 1100 is implemented by another suitable computing device.

At block 1102, a first user entry of a first link in a first document is received by a computing device. The first link refers to a first set of numerical values or non-texted based content having a source location that is external to the first user entry. In an embodiment, the first link corresponds to the first link 306 (FIG. 3A) and the first set of numerical values is the first content 396 of the document 394 (FIG. 3B) or a cell of a spreadsheet. In some embodiments, inserting a link is functionally different from copying and pasting content. For example, instead of a user manually editing the document to write in a numerical values from another location, a user merely selects the location at which the linked numerical values should be inserted, indicates that a link is desired (e.g., with a gesture or right-click), and selects the numerical values/non-text based content to be linked. Advantageously, the user does not need to have knowledge of the content from another location and any underlying code or data structure that supports the reference is not visible to the user.

At block 1104, the first user entry is displayed in a user interface that displays the first document in a format of the numerical values/non-text based content at a source location. In an embodiment, the first document corresponds to the first document 304 shown in FIG. 3C and the user interface corresponds to the user interface 302. In an embodiment, displaying the first document includes displaying the first document in an editing mode of the user interface, including updating the user interface to display both the first set of numerical values with the non-text based format of the source location and the second set of content without displaying the first link within the first user entry while in the editing mode of the user interface (i.e., without displaying a formula or data structure that causes the linked content to be retrieved). As an example, the editing mode is a mode where the user is actively able to change the content and a format of the content by providing input, for example, by typing in numbers on a keyboard (i.e., input device 158).

At block 1106, the first set of numerical values/non-text based content is retrieved using the first link. In an embodiment, for example, the client software 105a is configured to retrieve the content 396 from the media storage device 108. In some scenarios, the first set of numerical values is retrieved from the first document, for example, in a different location or section of the first document. In other scenarios, the first set of content is retrieved from a second document that is different from the first document. The second document may be, for example, a text document, spreadsheet document, presentation document, or other suitable document.

At block 1108, the user interface is updated to display both the first set of numerical values/non-text based content with the non-text based format of the source location and a second set of content that is distinct from the first set of numerical values. In an embodiment, for example, the user interface 302 of FIG. 3A is updated to the user interface 302 of FIG. 3C to display the first content 396 along with the second set of content, which may be the non-linked content. In some embodiments, the method 1000 also includes receiving a notice of a change to the first set of numerical values and automatically updating the user interface to display the change to the first set of numerical values.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art. The terminology used herein is for the purpose of describing the particular embodiments and is not intended to be limiting of exemplary embodiments of the disclosure. In the description of the embodiments, certain detailed explanations of related art are omitted when it is deemed that they may unnecessarily obscure the essence of the disclosure.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, a propagated signal is not included within the scope of computer-readable storage media. Computer-readable media may also include communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio and microwave are included in the definition of communication medium. Combinations of the above may also be included within the scope of computer-readable media.

Alternatively, and/or additionally, the functionality described herein may be performed, at least in part, by one or more hardware logic components. For example, and without limitation, illustrative types of hardware logic components that may be used include Field-Programmable Gate Arrays ("FPGAs"), Application-Specific Integrated Circuits ("ASICs"), Application-Specific Standard Products ("ASSPs"), System-on-Chips ("SOCs"), Complex Programmable Logic Devices ("CPLDs"), etc.

Also, using the disclosure herein, programmers of ordinary skill in the art to which the disclosure pertains may easily implement functional programs, codes, and code segments for making and using the disclosure.

The disclosure may be described in terms of functional block components and various processing steps. Such functional blocks may be realized by any number of hardware and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosure may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure as defined by the following claims. Therefore, the scope of the disclosure is defined not by the detailed description of the disclosure but by the following claims, and all differences within the scope will be construed as being included in the disclosure.

No item or component is essential to the practice of the disclosure unless the element is specifically described as "essential" or "critical". It will also be recognized that the terms "comprises", "comprising", "includes", "including", "has", and "having", as used herein, are specifically intended to be read as open-ended terms of art. The use of the terms "a" and "an" and "the" and similar referents in the context of describing the disclosure (especially in the context of the following claims) are to be construed to cover both the singular and the plural, unless the context clearly indicates otherwise. In addition, it should be understood that although the terms "first", "second", etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method for rendering linked content in a first document, the method comprising:
   receiving, at a computing device, a first user entry of a first link in the first document and receiving, with the first user entry of the first link in the first document, an indication that the first display format is turned on or turned off, wherein the first link refers to a first set of content having a source location that is external to the first user entry;
   displaying, by the computing device, the first set of content with a first display format of the source location in a user interface that displays the first document when the indication that the first display format is turned on, and displaying the first set of content with a second display format of a destination location in the user interface that displays the first document when the indication that the first display format is turned off, the first display format includes paragraph formatting properties for each paragraph of the first set of content, including:
   retrieving, by the computing device, the first set of content using the first link; and
   updating, by the computing device, the user interface to display both the first set of content with the first display format of the source location, and a second set of content that is distinct from the first set of content.

2. The method of claim 1, the method further comprising:
   receiving, at the computing device when the indication that the first display format is turned on, a second indication that the first display format is turned on or turned off, wherein displaying the first set of content with the first display format of the source location in the user interface that displays the first document includes:
   displaying the first set of content with the first display format of the source location in the user interface that displays the first document when the second indication that the first display format is turned on, and displaying the first set of content with a second display format of a destination location in the user interface that displays the first document when the second indication that the first display format is turned off.

3. A method for rendering linked content in a first document, the method comprising:
   receiving, at a computing device, a first user entry of a first link in the first document, wherein the first link refers to a first set of content having a source location that is external to the first user entry;
   displaying, by the computing device, the first set of content with a first display format of the source location in a user interface that displays the first document including:
   retrieving, by the computing device, the first set of content using the first link; and
   updating, by the computing device, the user interface to display both the first set of content with the first display format of the source location, and a second set of content that is distinct from the first set of content;
   receiving, at the computing device, an indication that the first display format is turned on or turned off,
   wherein displaying the first set of content with the first display format of the source location in the user interface that displays the first document includes:
   displaying the first set of content with the first display format of the source location in the user interface that displays the first document when the indication that the first display format is turned on, and displaying the first set of content with a second display format of a destination location in the user interface that displays the first document when the indication that the first display format is turned off.

4. The method of claim 3, the method further comprising:
receiving, by the computing device, a notice of a change to the first set of content; and
automatically updating, by the computing device, the user interface to display the change to the first set of content with the first display format of the source location.

5. The method of claim 3, wherein:
retrieving the first set of content using the first link includes retrieving the first set of content as plain text, and retrieving the first display format; and
displaying the first set of content with the first display format comprises formatting the plain text using the first display format.

6. The method of claim 3, wherein retrieving the first set of content using the first link includes retrieving the first set of content from a second document that is distinct from the first document.

7. The method of claim 3, the method further comprising:
receiving, at the computing device, an edit to the first display format of the displayed first set of content, the edit overriding the first display format; and
updating, by the computing device, the user interface to display both the first set of content with the overridden first display format.

8. The method of claim 3, the method further comprising:
displaying, by the computing device, a link properties box in the user interface, wherein the link properties box i) includes a list of sets of linked content within the first document, the list of sets including the first set of linked content, and ii) identifies source locations of the first set of content and destination locations of the first set of content.

9. The method of claim 3, the method further comprising:
inserting, by the computing device, a first uniform resource identifier, which identifies the source location of the first set of content, into a causal tree that represents a history of edits.

10. The method of claim 9, wherein inserting the first uniform resource identifier into the causal tree comprises inserting into the causal tree a first linking data structure configured to identify i) the first link, ii) the first set of content, and iii) a destination location within the first document at which the first link is to be processed.

11. The method of claim 10, wherein the first linking data structure is associated with an external linking system configured to monitor changes to source locations and destination locations.

12. The method of claim 10, wherein the first set of content includes a plurality of alphanumeric characters that are collectively represented in the causal tree as a single character that is replaced by the plurality of alphanumeric characters when displayed in the user interface.

13. The method of claim 10, wherein inserting into the causal tree the first linking data structure further includes inserting into the causal tree the first linking data structure configured to identify one or more formatting characters that identify the first display format.

14. The method of claim 3, wherein the source location of the first set of content is external to the first document.

15. The method of claim 3, wherein the first display format includes paragraph formatting properties for each paragraph of the first set of content.

16. A method for rendering linked content in a first document, the method including:
receiving, at a computing device, a first user entry of a first link in the first document, wherein the first link refers to a first set of non-text based content having a source location that is external to the first user entry;
displaying, by the computing device, the first set of non-text based content with a non-text based format of the source location in a user interface that displays the first document by formatting the non-text based content without formatting using the non-text based format, including:
retrieving, by the computing device, the first set of non-text based content using the first link by retrieving the first set of non-text based content without formatting, and retrieving the non-text based format; and
updating, by the computing device, the user interface to display both the first set of non-text based content with the non-text based format of the source location, and a second set of content that is distinct from the first set of content.

17. The method of claim 16, wherein the non-text based content includes at least one of numerical content and a numerical value.

18. The method of claim 16, wherein retrieving the first set of non-text based content using the first link includes retrieving the first set of non-text based content from a second document that is distinct from the first document.

19. The method of claim 16, the method further comprising:
receiving, at the computing device, an edit to a format of the displayed first set of non-texted based content, the edit overriding the format of the displayed first set of non-texted based content; and
updating, by the computing device, the user interface to display both the first set of non-text based content with the overridden non-text based format.

20. The method of claim 16, the method further comprising:
inserting a first uniform resource identifier, which identifies the source location of the first set of non-text based content, into a causal tree that represents a history of edits.

21. The method of claim 20, wherein inserting the first uniform resource identifier into the causal tree comprises inserting into the causal tree a first linking data structure configured to identify i) the first link, ii) the first set of non-text based content, and iii) a destination location within the first document at which the first link is to be processed.

22. The method of claim 21, wherein the first linking data structure is associated with an external linking system configured to monitor changes to source locations and destination locations.

23. The method of claim 20, wherein inserting into the causal tree the first linking data structure further includes inserting into the causal tree the first linking data structure configured to identify one or more formatting characters that identify the non-text based format.

* * * * *